United States Patent
Bogdan et al.

(10) Patent No.: US 6,638,987 B2
(45) Date of Patent: Oct. 28, 2003

(54) AZEOTROPE-LIKE COMPOSITIONS OF TETRAFLUOROETHANE, PENTAFLUOROPROPANE AND WATER

(75) Inventors: Mary C. Bogdan, West Seneca, NY (US); Gary M. Knopeck, Lakeview, NY (US); Hang T. Pham, Amherst, NY (US); Rajiv R. Singh, Getzville, NY (US); David Dressel, Houston, TX (US); David J. Williams, East Amherst, NY (US)

(73) Assignee: Honeywell International, Inc., Morristown, NJ (US)

( * ) Notice: Subject to any disclaimer, the term of this patent is extended or adjusted under 35 U.S.C. 154(b) by 0 days.

(21) Appl. No.: 10/166,440

(22) Filed: Jun. 10, 2002

(65) Prior Publication Data

US 2003/0073594 A1 Apr. 17, 2003

Related U.S. Application Data

(60) Provisional application No. 60/297,201, filed on Jun. 8, 2001.

(51) Int. Cl.$^7$ .............................. C08J 9/14; B01D 3/34
(52) U.S. Cl. ..................... 521/131; 203/52; 203/53; 203/67; 252/67; 252/182.24; 510/410; 510/411; 510/412; 510/415; 521/130; 521/155; 521/170; 521/174
(58) Field of Search ................................ 521/130, 131, 521/155, 170, 174; 203/52, 53, 67; 252/67, 182.24; 510/410, 411, 412, 415

(56) References Cited

U.S. PATENT DOCUMENTS

| | | | |
|---|---|---|---|
| 2,834,748 A | 5/1958 | Bailey et al. | |
| 2,846,458 A | 8/1958 | Haluska | |
| 2,917,480 A | 12/1959 | Bailey et al. | |
| 6,043,291 A | 3/2000 | Takeyasu et al. | |
| 6,100,230 A | 8/2000 | Bement et al. | |

OTHER PUBLICATIONS

Saunders, J. H. and Frisch, K. C. "Polurethanes Chemistry and Technology" *Interscience Publishers*, vol. XVI, Part 1, 219–223 & Part II, 193–201 (1964).

Primary Examiner—John M. Cooney, Jr.
(74) Attorney, Agent, or Firm—Colleen D. Szuch

(57) ABSTRACT

This invention provides azeotrope-like compositions of 1,1,1,2-tetrafluoroethane, 1,1,1,3,3-pentafluoropropane-245fa and water that are environmentally desirable for use as refrigerants, aerosol propellants, metered dose inhalers, blowing agents for polymer foam, heat transfer media, and gaseous dielectrics.

24 Claims, 1 Drawing Sheet

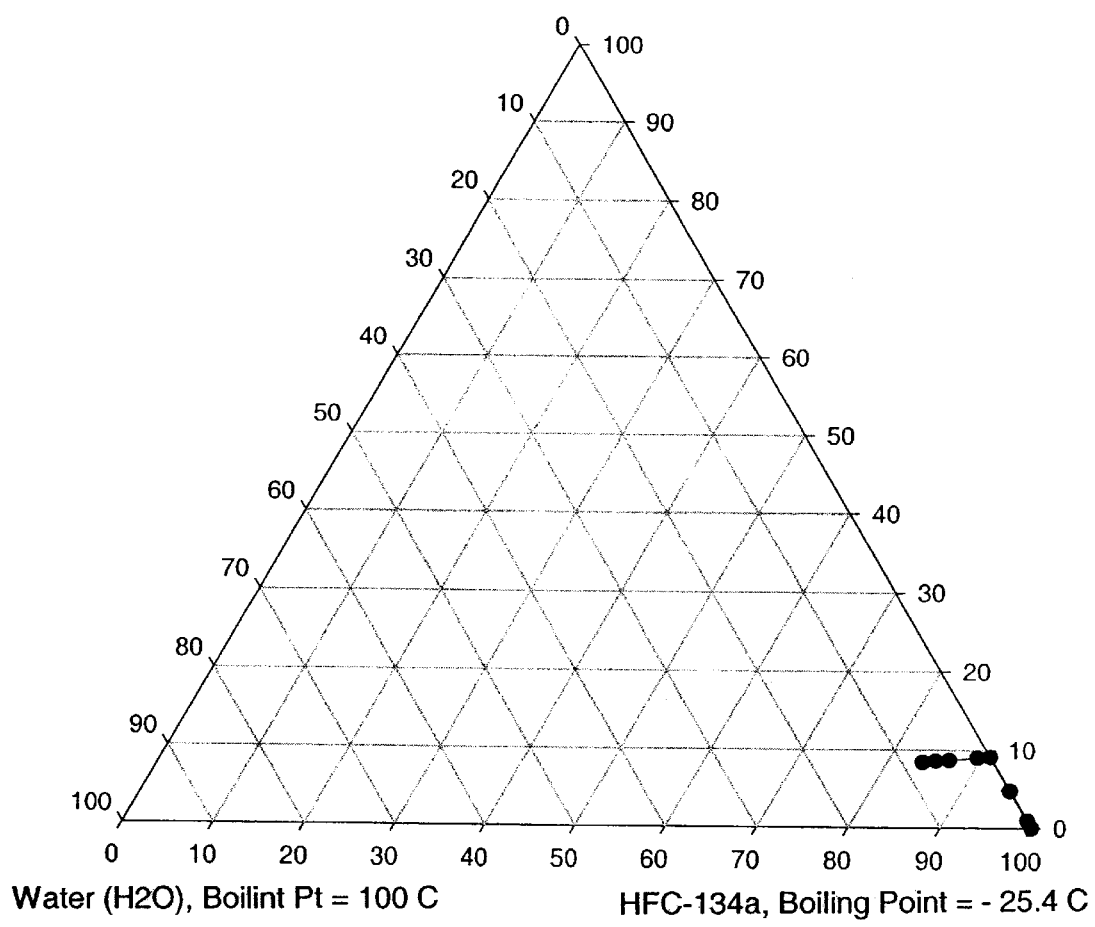

AZEOTROPE-LIKE COMPOSITIONS OF TETRAFLUOROETHANE, PENTAFLUOROPROPANE AND WATER

CROSS-REFERENCE TO A RELATED APPLICATION

This application claims priority to provisional application serial No. 60/297,201, which was filed with the United States Patent and Trademark Office on Jun. 8, 2001, and is incorporated herein by reference.

FIELD OF THE INVENTION

The present invention provides azeotrope-like compositions of tetrafluoroethane, pentafluoropropane, and water, and uses thereof.

BACKGROUND

Fluorocarbon based fluids have found widespread use in industry in a number of applications, including as refrigerants, aerosol propellants, blowing agents, heat transfer media, and gaseous dielectrics. Because of the suspected environmental problems associated with the use of some of these fluids, it is desirable to use fluids having low or even zero ozone depletion potential, such as hydrofluorocarbons ("HFC's"). Thus, the use of fluids that do not contain chlorofluorocarbons ("CFCs") or hydrochlorofluorocarbons ("HCFCs") is desirable. Additionally, the use of single component fluids or azeotropic mixtures, which do not fractionate on boiling and evaporation, is desirable. However, the identification of new, environmentally-safe, non-fractionating mixtures is complicated due to the fact that azeotrope formation is not readily predictable.

The industry is continually seeking new fluorocarbon based mixtures that offer alternatives, and are considered environmentally safer substitutes for CFCs and HCFCs. Of particular interest are mixtures containing both hydrofluorocarbons and non-fluorocarbons, both of low ozone depletion potentials. Such mixtures are the subject of this invention.

BRIEF DESCRIPTION OF THE DRAWINGS

FIG. 1 is a ternary boiling point plot for compositions comprising 1,1,1,2-tetrafluoroethane, 1,1,1,3,3-pentafluoropropane, and water.

DETAILED DESCRIPTION OF THE PREFERRED EMBODIMENT

The present inventors have developed several compositions that can help to satisfy the continuing need for substitutes for CFCs and HCFCs. In one embodiment, the present invention provides azeotrope-like compositions comprising 1,1,1,2-tetrafluoroethane ("HFC-134a"), 1,1,1,3,3-pentafluoropropane ("HFC-245fa"), and water.

The preferred compositions of the invention provide environmentally desirable, zero ozone depletion potential replacements for currently used CFC's and HCFC's. Additionally, the compositions of the invention exhibit characteristics that make the compositions better CFC and HCFC substitutes than any of 1,1,1,2-tetrafluoroethane, 1,1,1,3,3-pentafluoropropane, or water alone.

The Compositions

The present compositions are azeotrope-like compositions. As used herein, the term "azeotrope-like" is intended in its broad sense to include both compositions that are strictly azeotropic and compositions that behave like azeotropic mixtures. From fundamental principles, the thermodynamic state of a fluid is defined by pressure, temperature, liquid composition, and vapor composition. An azeotropic mixture is a system of two or more components in which the liquid composition and vapor composition are equal at the stated pressure and temperature. In practice, this means that the components of an azeotropic mixture are constant boiling and cannot be separated during a phase change.

Azeotrope-like compositions are constant boiling or essentially constant boiling. In other words, for azeotrope-like compositions, the composition of the vapor formed during boiling or evaporation is identical, or substantially identical, to the original liquid composition. Thus, with boiling or evaporation, the liquid composition changes, if at all, only to a minimal or negligible extent. This is to be contrasted with non-azeotrope-like compositions in which, during boiling or evaporation, the liquid composition changes to a substantial degree. All azeotrope-like compositions of the invention within the indicated ranges as well as certain compositions outside these ranges are azeotrope-like.

The azeotrope-like compositions of the invention may include additional components that do not form new azeotrope-like systems, or additional components that are not in the first distillation cut. The first distillation cut is the first cut taken after the distillation column displays steady state operation under total reflux conditions. One way to determine whether the addition of a component forms a new azeotrope-like system so as to be outside of this invention is to distill a sample of the composition with the component under conditions that would be expected to separate a non-azeotropic mixture into its separate components. If the mixture containing the additional component is non-azeotrope-like, the additional component will fractionate from the azeotrope-like components. If the mixture is azeotrope-like, some finite amount of a first distillation cut will be obtained that contains all of the mixture components that is constant boiling or behaves as a single substance.

It follows from this that another characteristic of azeotrope-like compositions is that there is a range of compositions containing the same components in varying proportions that are azeotrope-like or constant boiling. All such compositions are intended to be covered by the terms "azeotrope-like" and "constant boiling". As an example, it is well known that at differing pressures, the composition of a given azeotrope will vary at least slightly, as does the boiling point of the composition. Thus, an azeotrope of A and B represents a unique type of relationship, but with a variable composition depending on temperature and/or pressure. It follows that, for azeotrope-like compositions, there is a range of compositions containing the same components in varying proportions that are azeotrope-like. All such compositions are intended to be covered by the term azeotrope-like as used herein.

These embodiments preferably provide azeotrope-like compositions comprising, and preferably consisting essentially of, from about 10 to about 98 parts by weight HFC-134a, from about 1 to about 60 parts by weight of HFC-245fa, and from about 1 to about 60 parts by weight water. Such compositions are characterized by a boiling point of -25.80° C.±4° C., preferably ±2° C., more preferably ±1° C. at about 14.57 psia (753 mmHg).

The preferred, more preferred, and most preferred compositions of this embodiment are set forth in Table 1. The numerical ranges in Table 1 are to be understood to be prefaced by the term "about".

TABLE 1

| Components | Preferred (wt %) | More Preferred (wt %) | Most Preferred (wt %) |
|---|---|---|---|
| HFC-134a | 10–98 | 40–98 | 70–98 |
| HFC-245fa | 60–1 | 30–1 | 10–1 |
| water | 60–1 | 30–1 | 10–1 |

Uses and Methods

The compositions of the present invention may be used in a wide variety of applications as substitutes for CFCs and HCFCs. For example, the present compositions are useful as solvents, blowing agents, refrigerants, cleaning agents and aerosols.

One embodiment of the present invention relates to a blowing agent comprising one or more of the azeotrope-like compositions of the invention. In other embodiments, the invention provides foamable compositions, and preferably polyurethane and polyisocyanurate foam compositions, and methods of preparing foams. In such foam embodiments, one or more of the present azeotrope-like compositions are included as a blowing agent in a foamable composition, which composition preferably includes one or more additional components capable of reacting and foaming under the proper conditions to form a foam or cellular structure, as is well known in the art. The present methods preferably comprise providing such a foamable composition and reacting it under conditions effective to obtain a foam, and preferably a closed cell foam. The invention also relates to foam, and preferably closed cell foam, prepared from a polymer foam formulation containing a blowing agent comprising the azeotrope-like composition of the invention.

Any of the methods well known in the art, such as those described in "Polyurethanes Chemistry and Technology," Volumes I and II, Saunders and Frisch, 1962, John Wiley and Sons, New York, N.Y., which is incorporated herein by reference, may be used or adapted for use in accordance with the foam embodiments of the present invention. In general, such preferred methods comprise preparing polyurethane or polyisocyanurate foams by combining an isocyanate, a polyol or mixture of polyols, a blowing agent or mixture of blowing agents comprising one or more of the present compositions, and other materials such as catalysts, surfactants, and optionally, flame retardants, colorants, or other additives. It is convenient in many applications to provide the components for polyurethane or polyisocyanurate foams in pre-blended formulations. Most typically, the foam formulation is pre-blended into two components. The isocyanate and optionally certain surfactants and blowing agents comprise the first component, commonly referred to as the "A" component. The polyol or polyol mixture, surfactant, catalysts, blowing agents, flame retardant, and other isocyanate reactive components comprise the second component, commonly referred to as the "B" component. Accordingly, polyurethane or polyisocyanurate foams are readily prepared by bringing together the A and B side components either by hand mix for small preparations and, preferably, machine mix techniques to form blocks, slabs, laminates, pour-in-place panels and other items, spray applied foams, froths, and the like. Optionally, other ingredients such as fire retardants, colorants, auxiliary blowing agents, and even other polyols can be added as a third stream to the mix head or reaction site. Most conveniently, however, they are all incorporated into one B-component as described above.

It is also possible to produce thermoplastic foams using the compositions of the invention. For example, conventional foam polyurethanes and isocyanurate formulations may be combined with the azeotrope-like compositions in a conventional manner to produce rigid foams.

Azeotrope-like mixtures containing HFC-134a in accordance with the present invention are particularly suitable as foam blowing agents since foams blown with HFC-134a have been found to possess low relative initial and aged thermal conductivity and good dimensional stability at low temperatures. Of particular interest are those azeotrope-like compositions of the present invention that optionally further contain other zero ozone depleting materials, such as, for example, other hydrofluorocarbons, e.g., difluoromethane (HFC-32); difluoroethane (HFC-152); trifluoroethane (HFC-143); tetrafluoroethane (HFC-134); pentafluoroethane (HFC-125); pentafluoropropane (HFC-245); hexafluoropropane (HFC-236); heptafluoropropane (HFC-227); pentafluorobutane (HFC-365) and inert gases, e.g., air, nitrogen, carbon dioxide. Where isomerism is possible for the hydrofluorocarbons mentioned above, the respective isomers may be used either singly or in the form of a mixture.

Dispersing agents, cell stabilizers, and surfactants may also be incorporated into the blowing agent mixture. Surfactants, better known as silicone oils, are added to serve as cell stabilizers. Some representative materials are sold under the names of DC-193, B-8404, and L-5340 which are, generally, polysiloxane polyoxyalkylene block co-polymers such as those disclosed in U.S. Pat. Nos. 2,834,748, 2,917,480, and 2,846,458. Other optional additives for the blowing agent mixture may include flame retardants such as tri(2-chloroethyl)phosphate, tri(2-chloropropyl)phosphate, tri(2,3-dibromopropyl)-phosphate, tri(1,3-dichloropropyl) phosphate, diammonium phosphate, various halogenated aromatic compounds, antimony oxide, aluminum trihydrate, polyvinyl chloride, and the like.

In another embodiment, the azeotrope-like compositions of this invention may be used as propellants in sprayable compositions, either alone or in combination with known propellants. The sprayable composition comprises, consists essentially of, and consists of a material to be sprayed and a propellant comprising, consisting essentially of, and consisting of the azeotrope-like compositions of the invention. Inert ingredients, solvents, and other materials may also be present in the sprayable mixture. Preferably, the sprayable composition is an aerosol. Suitable materials to be sprayed include, without limitation, cosmetic materials such as deodorants, perfumes, hair sprays, cleansers, and polishing agents as well as medicinal materials such as anti-asthma and anti-halitosis medications.

In another process embodiment, a process for removing water from 1,1,1,2-tetrafluoroethane is provided, which process comprises the step of distilling a mixture of 1,1,1,2-tetrafluoroethane, HFC-245fa, and water to separate an azeotrope or azeotrope-like composition consisting essentially of HFC-134a, HFC-245fa, and water from HFC-134a present in excess of the concentration of said azeotrope. Thus, an HFC-134a/HFC-245fa/water azeotrope can be used to remove bulk amounts of water in a HFC-134a manufacturing process. In a commercial process, trace amounts of acidic components in HFC-134a may be removed by water wash. After water washing, the HFC-134a layer is phase-separated. Accordingly, in another embodiment of the invention, a process is provided in which a mixture of 1,1,1,2-tetrafluoroethane/HFC-245fa/water is phase separated to remove bulk amounts of water before conducting said distillation step. Residual amounts of water in the HFC-134a phase can be distilled out because of the existence of the HFC-134a/HFC-245fa/water azeotrope. Subsequent distillation or multiple distillations can be used to remove trace amounts of water along with other impurities to achieve the desired purity.

The components of the composition of the invention are known materials that are commercially available or may be prepared by known methods. Preferably, the components are of sufficiently high purity so as to avoid the introduction of adverse influences upon cooling or heating properties, constant boiling properties, or blowing agent properties of the system. In the case of metered dose inhalers, the relevant current Good Manufacturing Process may be used for manufacturing these materials.

Additional components may be added to tailor the properties of the azeotrope-like compositions of the invention as needed. By way of example, oil solubility aids may be added in the case in which the compositions of the invention are used as refrigerants. Stabilizers and other materials may also be added to enhance the properties of the compositions of the invention.

EXAMPLES

The present invention is further illustrated via the following examples which are not intended to be limiting in any manner.

Example 1

An ebulliometer consisting of vacuum jacketed tube with a condenser on top is used. About 20 g HFC-134a are charged to the ebulliometer and then HFC-245fa is added in small, measured increments and water is added in small, measured increments. Temperature depression is observed when HFC-245fa and water are added to HFC-134a, indicating a ternary minimum boiling azeotrope is formed. From about 0.1 to about 30-weight percent HFC-245fa, and from 0.1 to 9–10 weight percent of water, the boiling point of the composition changes by about 1° C. or less. The ternary mixtures shown in Table 2 are studied and the boiling point of the compositions changes by about 1° C. Therefore, the composition exhibits azeotrope and/or azeotrope-like properties over this range.

TABLE 2

| wt. % 134a | wt. % 245fa | wt. % water | boiling point (° C.) at 14.57 psia |
|---|---|---|---|
| 100.00 | 0.00 | 0.00 | −25.41 |
| 99.06 | 0.94 | 0.00 | −25.65 |
| 95.22 | 4.78 | 0.00 | −25.8 |
| 90.88 | 9.12 | 0.00 | −25.5 |
| 90.68 | 9.10 | 0.21 | −25.5 |
| 89.53 | 8.99 | 1.48 | −25.5 |
| 88.04 | 8.84 | 3.13 | −25.5 |
| 86.59 | 8.69 | 4.72 | −25.5 |
| 85.20 | 8.55 | 6.25 | −25.5 |
| 83.84 | 8.42 | 7.74 | −25.5 |
| 82.53 | 8.28 | 9.18 | −25.5 |

FIG. 1 is a graphical representation of the boiling point data listed in Table 2.

Example 2

100 g of a polyether with a hydroxyl value of 380, a result from the addition of propylene oxide to a solution of saccharose, propylene glycol and water, is mixed with 2 g of a siloxane polyether copolymer as foam stabilizer, and 3 g of dimethylcyclohexylamine. With stirring, 100 g of the mixture is thoroughly mixed with 15 g of the azeotrope-like composition of Example 1 as blowing agent. The resulting mixture is foamed with 152 g of crude 4,4' diisocyanatodiphenylmethane. The resulting rigid foam is inspected and found to be of good quality.

Example 3

This example illustrates the thermal data associated with foams prepared using blowing agent compositions according to the present invention. The following materials are used in the Example:

Polyol: A blend of polyester and polyether polyols. It is a commercially available material.

HFC-245fa, HFC-134a: 1,1,1,3,3-pentafluorpropane, 1,1,1,2-tetrafluoroethane available from Honeywell Surfactant A: A polysiloxane polyether copolymer, which is commercially available from Goldschmidt.

Catalyst pkg.: A blend of amine catalysts available from Air Products.

Two foams ("F 1" and "F2") are prepared using spray foam equipment such as the Gusmer H-2000 spray foam machine. This equipment has the capability of third stream injection of a gaseous blowing agent. For each blowing agent or blowing agent pair, a premix of polyol, surfactant, HFC-245fa, water and catalysts is prepared in the same proportions displayed in Table 3. A sufficient amount of material is blended to fill the supply vessels and lines of the spray foam machine. The premix is blended in a large pail and stirred at about 1500 rpm with a Conn 2" diameter ITC mixer until a homogeneous blend is achieved.

When mixing is complete, the material is added to the supply vessel for the spray foam machine. The isocyanate component is added from the supply vessel attached to the machine.

The foam is sprayed using standard spray foam conditions and gun onto cardboard and allowed to rise. The HFC-134a is added as a gas through the supply line prior to the spray gun. Cream, initiation, gel and tack free times are recorded for the individual polyurethane foam samples.

The foams are allowed to cure at room temperature for at least 24 hours. After curing, the blocks are trimmed to a uniform size and densities measured.

The foams are tested for k-factor and the k-factor results are listed in Table 3.

TABLE 3

| Job # | F1 | F2 |
|---|---|---|
| Component (pbw) | | |
| Polyol Blend | 75.6 | 73.6 |
| Surfactant | 1.3 | 1.1 |
| Catalyst pkg. | 2.8 | 5.5 |
| Glycerin | 1 | — |
| Stabilizer | 0.1 | 0.1 |
| Water | 0.3 | 0.7 |
| HFC-245fa | 19.0 | 16 |
| HFC-134a | 0 | 7 |
| Density | 2.02 | 2.02 |
| k-factor | | |
| 75° F. | .146 | .144 |

What is claimed is:

1. An azeotrope-like composition consisting essentially of from about 1 to about 60 weight percent water, from about 1 to about 60 weight percent HFC-245fa and from about 98 to about 10 weight percent 1,1,1,2-tetrafluoroethane, which compositions have a boiling point of −25.80° C.±4 at 14.57 psia.

2. The azeotrope-like composition of claim 1 consisting essentially of from about 1 to about 30 weight percent water, from about 1 to about 30 weight percent HFC-245fa and from about 98 to about 40 weight percent 1,1,1,2-tetrafluoroethane.

3. The azeotrope-like composition of claim 1 consisting essentially of from about 1 to about 10 weight percent water, from about 1 to about 10 weight percent HFC-245fa and from about 98 to about 70 weight percent 1,1,1,2-tetrafluoroethane.

4. A blowing agent composition comprising an azeotrope-like composition of claim 1.

5. A blowing agent composition comprising an azeotrope-like composition of claim 2.

6. A blowing agent composition comprising an azeotrope-like composition of claim 3.

7. A method for producing polyurethane and polyisocyanurate foams comprising reacting and foaming a mixture of ingredients that react to form the polyurethane and polyisocyanurate foams in the presence of a volatile blowing agent comprising a composition of claim 1.

8. A method for producing polyurethane and polyisocyanurate foams comprising reacting and foaming a mixture of ingredients that react to form the polyurethane and polyisocyanurate foams in the presence of a volatile blowing agent comprising a composition of claim 2.

9. A method for producing polyurethane and polyisocyanurate foams comprising reacting and foaming a mixture of ingredients that react to form the polyurethane and polyisocyanurate foams in the presence of a volatile blowing agent comprising a composition of claim 3.

10. A closed cell foam composition prepared by foaming a polyisocyanate or polyisocyanurate in the presence of a blowing agent comprising an azeotrope-like composition of claim 1.

11. A closed cell foam composition prepared by foaming a polyisocyanate or polyisocyanurate in the presence of a blowing agent comprising an azeotrope-like composition of claim 2.

12. A closed cell foam composition prepared by foaming a polyisocyanate or polyisocyanurate in the presence of a blowing agent comprising an azeotrope-like composition of claim 3.

13. A premix of a polyol and a blowing agent comprising an azeotrope-like composition of claim 1.

14. A premix of a polyol and a blowing agent comprising a composition of claim 2.

15. A premix of a polyol and a blowing agent comprising a composition of claim 3.

16. A sprayable composition comprising a material to be sprayed and a propellant comprising a composition of claim 1.

17. A sprayable composition according to claim 16 wherein the sprayable composition is an aerosol.

18. A sprayable composition according to claim 17 wherein the sprayable composition is a cosmetic material.

19. The composition of claim 17 wherein the material to be sprayed is a medicinal material.

20. A process for removing water from 1,1,1,2-tetrafluoroethane which process comprises distilling a mixture of 1,1,1,2-tetrafluoroethane, HFC-245fa and water to separate an azeotrope or azeotrope-like composition consisting essentially of 1,1,1,2-tetrafluoroethane, HFC-245fa, and water from 1,1,1,2-tetrafluoroethane present in excess of the concentration of said azeotrope.

21. A process as described in claim 20 wherein said mixture of 1,1,1,2-tetrafluoroethane and water is phase separated to remove bulk amounts of water before conducting said distillation step.

22. A closed cell foam containing a cell gas prepared from a blowing agent as defined in claim 4.

23. A closed cell foam containing a cell gas prepared from a blowing agent as defined in claim 5.

24. A closed cell foam containing a cell gas prepared from a blowing agent as defined in claim 6.

* * * * *